US012762047B2

(12) United States Patent
Guo et al.

(10) Patent No.: US 12,762,047 B2
(45) Date of Patent: Oct. 13, 2026

(54) CROSS-CABINET SERVER MEMORY POOLING METHOD, APPARATUS AND DEVICE, SERVER, AND MEDIUM

(71) Applicant: IEIT SYSTEMS CO., LTD., Jinan (CN)

(72) Inventors: Zhenhua Guo, Jinan (CN); Zhiyong Qiu, Jinan (CN); Baoyu Fan, Jinan (CN); Yaqian Zhao, Jinan (CN); Rengang Li, Jinan (CN)

(73) Assignee: IEIT SYSTEMS CO., LTD., Jinan (CN)

( * ) Notice: Subject to any disclaimer, the term of this patent is extended or adjusted under 35 U.S.C. 154(b) by 0 days.

(21) Appl. No.: 18/878,022

(22) PCT Filed: Feb. 7, 2024

(86) PCT No.: PCT/CN2024/076756
§ 371 (c)(1),
(2) Date: Dec. 21, 2024

(87) PCT Pub. No.: WO2024/179298
PCT Pub. Date: Sep. 6, 2024

(65) Prior Publication Data
US 2025/0165386 A1 May 22, 2025

(30) Foreign Application Priority Data
Feb. 27, 2023 (CN) ......................... 202310166793.3

(51) Int. Cl.
*G06F 12/02* (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS 10,649,759 B1 * 5/2020 Delange .................. G06F 11/07
2013/0297763 A1 11/2013 Lou et al.
(Continued)

FOREIGN PATENT DOCUMENTS

CN 104424105 A 3/2015
CN 104834480 A 8/2015
(Continued)

OTHER PUBLICATIONS

Shang Liu, et al. "Reliability and Availability Analysis Considering Resources." Quality and Reliability, Issue 04, 2020. Aug. 15, 2020.
(Continued)

*Primary Examiner* — Hosain T Alam
*Assistant Examiner* — Ryan Dare
(74) *Attorney, Agent, or Firm* — IPro, PLLC

(57) ABSTRACT

The present application relates to the field of servers, and discloses a cross-cabinet server memory pooling method, apparatus and device, a server, and a medium, used for pooling server memories. Considering that the memory use conditions of different server cabinets in the same server cluster are different, a communication device is built between different server cabinets in the present application; a server cabinet may apply another server cabinet for the memory use permission of a first target device; after the memory use permission is successfully applied, a device memory may be used across the cabinets, so that the memory use requirements of server cabinets are met while the number of memory devices is not increased, and the resource utilization rate is improved.

14 Claims, 3 Drawing Sheets

(56) References Cited

U.S. PATENT DOCUMENTS

| | | | | |
|---|---|---|---|---|
| 2017/0034268 | A1 | 2/2017 | Govind | |
| 2019/0034763 | A1* | 1/2019 | Guim Bernat | H04L 41/5003 |
| 2022/0197819 | A1* | 6/2022 | Kumar | G06F 12/109 |
| 2023/0132302 | A1* | 4/2023 | Hu | G06F 15/17331 709/212 |
| 2024/0037026 | A1* | 2/2024 | Price | G06F 3/0631 |
| 2024/0094922 | A1* | 3/2024 | Niu | G06F 11/10 |
| 2025/0004812 | A1* | 1/2025 | Radi | G06F 9/45558 |
| 2025/0068468 | A1* | 2/2025 | Guan | G06F 12/0646 |
| 2025/0068748 | A1* | 2/2025 | Guan | G06F 21/606 |
| 2025/0103390 | A1* | 3/2025 | Sun | G06F 9/544 |

FOREIGN PATENT DOCUMENTS

| | | | |
|---|---|---|---|
| CN | 105094997 | A | 11/2015 |
| CN | 105205182 | A | 12/2015 |
| CN | 105512091 | A | 4/2016 |
| CN | 105635214 | A | 6/2016 |
| CN | 105786625 | A | 7/2016 |
| CN | 107135123 | A | 9/2017 |
| CN | 109189347 | A | 1/2019 |
| CN | 109918203 | A | 6/2019 |
| CN | 110198346 | A | 9/2019 |
| CN | 110855772 | A | 2/2020 |
| CN | 111625356 | A | 9/2020 |
| CN | 112783658 | A | 5/2021 |
| CN | 112948149 | A | 6/2021 |
| CN | 113806066 | A | 12/2021 |
| CN | 113852656 | A | 12/2021 |
| CN | 114020454 | A | 2/2022 |
| CN | 114253733 | A | 3/2022 |
| CN | 114390050 | A | 4/2022 |
| CN | 114968895 | A | 8/2022 |
| CN | 115567400 | A | 1/2023 |
| CN | 115660369 | A | 1/2023 |
| CN | 116028232 | A | 4/2023 |
| WO | 2022188887 | A1 | 9/2022 |
| WO | 2023273559 | A1 | 1/2023 |

OTHER PUBLICATIONS

Hao Jin, et al. "Research on a transmission control method for RDMA." Network Security Technology and Application. Issue 05, 2020. May 15, 2020.

Xiaolin Zhu. "Design and implementation of ISDN server based on CCTS-3 level train control system." Railway Communication signals, Issue 09, 2016. Sep. 17, 2016.

Lakhotia, Aanchal, et al. "Fault tree analysis to understand and improve reliability of memory modules used in data center server racks." Procedia Manufacturing 51 (2020): 989-997.

* cited by examiner

CROSS-CABINET SERVER MEMORY POOLING METHOD, APPARATUS AND DEVICE, SERVER, AND MEDIUM

CROSS-REFERENCE TO RELATED APPLICATION

This application claims the priority of Chinese patent application filed in CNIPA on Feb. 27, 2023, with the application number of 202310166793.3 and the application name of "cross-cabinet server memory pooling method, apparatus and device, server, and medium", the entire contents of which are incorporated into this application by reference.

FIELD

The present disclosure relates to the field of servers, in particular to a cross-cabinet server memory pooling method, and also relates to a cross-cabinet server memory pooling apparatus, device, server and non-transitory computer-readable storage medium.

BACKGROUND

In the era of big data, servers are widely used in various industries. Servers are often used in a form of clusters, and server clusters usually include a plurality of server cabinets, and each cabinet includes a plurality of servers. With development of technology, all servers in each server cabinet have an increasing requirement for memory resources. However, directly increasing memory devices in a server cabinet will not only increase a volume of the server cabinet, but also increase cost. Limiting a number of memory devices used will lead to performance bottlenecks in the server cabinet.

SUMMARY

A purpose of the present disclosure is to provide a cross-cabinet server memory pooling method, which may realize use of memory devices for cross cabinets, meet a requirement of memory usage of each server cabinet without increasing a number of memory devices and improve resource utilization. Another purpose of the present disclosure is to provide a cross-cabinet server memory pooling apparatus, device, server and non-transitory computer-readable storage medium, which may realize use of memory devices for cross cabinets, meet a requirement of memory usage of each server cabinet without increasing a number of memory devices and improve resource utilization.

In order to resolve above technical problems, the present disclosure provides a cross-cabinet server memory pooling method, including:

- in response to a memory allocation request for a first target device sent by a target cabinet outside a cabinet where a server is located, transferring a control authority of the cabinet where the server is located on the first target device to a target cabinet, so that the target cabinet may use a memory of the first target device;
- in response to a memory reading request sent by the target cabinet through a communication device for data to be read in a memory of the first target device, sending the data to be read in the memory of the first target device to the target cabinet through the communication device;
- in response to a memory writing request sent by the target cabinet through the communication device for the memory of the first target device, writing data to be written sent by the target cabinet through the communication device into the memory of the first target device.

In some embodiments, the communication device includes:

- a plurality of processing devices respectively connected with server cabinets corresponding to processing devices one by one and a first communication network, which are configured to send a memory usage request and the data to be read and written sent by a main server cabinet to the first communication network, and send the memory usage request and the data to be read and written received through the first communication network to the main server cabinet;
- the first communication network, configured to send the received memory usage request and the data to be read and written to the processing devices corresponding to respective destination cabinets;
- wherein, the memory usage request includes the memory reading request and the memory writing request, the data to be read and written includes the data to be written and the data to be read, and the main server cabinet is a server cabinet connected with the processing device.

In some embodiments, the processing device includes:

- a storage device connected with the server cabinets corresponding to the storage device one by one, configured to send the memory usage request and the data to be read and written sent by the main server cabinet to a control device, and send the memory usage request and the data to be read and written received by the control device through the first communication network to the main server cabinet;
- the control devices respectively connected with the storage device and the first communication network, configured to send the memory usage request and the data to be read and written sent by the storage device to the first communication network, and send the memory usage request and the data to be read and written received through the first communication network to the main server cabinet.

In some embodiments, the storage device includes:

- a storage equipment connected with the server cabinets corresponding to the storage equipment one by one, configured to send the memory usage request sent by the main server cabinet to the control device, send the data to be read and written sent by the main server cabinet to a cache device, send the memory usage request received by the control device through the first communication network to the main server cabinet, and send the data to be read and written by the control device into the cache device to the main server cabinet;
- the cache device connected with the storage equipment;
- wherein, the control device is respectively connected with the storage equipment, the cache device and the first communication network, and the control device is specifically configured to send the memory usage request sent by the storage equipment to the first communication network, send the data to be read and written sent by the storage equipment to the cache device to the first communication network, send the memory usage request received through the first communication network to the storage equipment, and send the data to be read and written received through the first communication network to the cache device.

In some embodiments, the control device includes a format conversion module and a controller;

the format conversion module is configured to convert the memory usage request sent by the storage equipment to the controller from a first data format of the main server cabinet to a specified second data format, so that the controller may identify to use, and convert the memory usage request sent by the main server cabinet to the storage equipment from the second data format to the first data format;

the controller is configured to send the memory usage request sent by the format conversion module to the first communication network, send the data to be read and written sent by the storage equipment to the cache device to the first communication network, send the memory usage request received through the first communication network to the format conversion module, and send the data to be read and written received through the first communication network to the cache device.

In some embodiments, the storage equipment, the format conversion module and the controller are integrated to a field programmable gate array (FPGA).

In some embodiments, the first communication network is a Remote Direct Data Access (RDMA) network based on a Compute Express Link (CXL) protocol.

In some embodiments, the method is applied to servers; the cross-cabinet server memory pooling method also includes:

in response to a memory allocation request for a second target device sent by a first target server in the cabinet where the server is located, releasing a control over the second target device by the server and sending a successful allocation instruction to the first target server, so that the first target server responds to a received successful allocation instruction to address all heterogeneous computing devices containing memories under current jurisdiction of the server and the second target device in a unified manner;

wherein, CPUs of all servers in a single server cabinet are connected with the second communication network, and all heterogeneous computing devices containing memories in the single server cabinet are connected with the second communication network.

In some embodiments, the cross-cabinet server memory pooling method further includes:

when a memory space of the server is insufficient, determining whether there are remaining memory resources in other servers in the cabinet where the server is located;

sending a memory allocation request for a third target device to a second target server in the cabinet where the server is located if there are remaining memory resources in other servers in the cabinet where the server is located;

in response to the successful allocation instruction received from the second target server, addressing all the heterogeneous computing devices containing memories under the current jurisdiction of the server and the second target device in a unified manner for memory use.

In some embodiments, after in response to the successful allocation instruction received from the second target server, addressing all the heterogeneous computing devices containing memories under the current jurisdiction of the server and the second target device in a unified manner, the cross-cabinet server memory pooling method further includes:

sending information of all heterogeneous computing devices containing memories under the current jurisdiction of the server to other servers in the server cabinet where the server is located and keep in communication with the server.

In some embodiments, the second communication network is a virtual high speed bus bridge network (vHSBB).

In some embodiments, the cross-cabinet server memory pooling method further includes:

controlling a prompter to prompt the information of all heterogeneous computing devices containing memories under the current jurisdiction of the server.

In some embodiments, the cross-cabinet server memory pooling method further includes:

when a memory space of the server is insufficient, determining whether there are remaining memory resources in other servers in the cabinet where the server is located;

if there are no remaining memory resources in other servers in the cabinet where the server is located, sending a memory allocation request for a fourth target device to the target cabinet outside the cabinet where the server is located;

determining whether a successful allocation fed back by the target cabinet is received;

sending a memory usage request to the fourth target device applied in the target cabinet, if the successful allocation signal fed back by the target cabinet is received.

In some embodiments, after determining whether the successful allocation signal fed back by the target cabinet is received, the cross-cabinet server memory pooling method further includes:

if the successful allocation signal fed back by the target cabinet is not received, controlling the prompter to prompt that a memory allocation fails.

In some embodiments, the cross-cabinet server memory pooling method further includes: determining whether a free memory space of all heterogeneous computing devices containing memories under the current jurisdiction of the server is greater than a preset value;

if the free memory space of all heterogeneous computing devices containing memories under the current jurisdiction of the server is greater than the preset value, determining whether an existence duration of the free memory space greater than the preset value reaches a preset duration;

if the existence duration of the free memory space greater than the preset value reaches the preset duration, controlling the prompter to prompt that a memory is free.

In some embodiments, after determining whether the existence duration of the free memory space greater than the preset value reaches a preset duration, the cross-cabinet server memory pooling method further includes:

if the existence duration of the free memory space greater than the preset value reaches the preset duration, determining a third target server with the smallest remaining memory space in the server cabinet where the server is located;

transferring the control right of the heterogeneous computing device with the largest remaining memory space under its jurisdiction to the third target server.

In order to resolve above problems, the present disclosure also provides a cross-cabinet server memory pooling apparatus, including:

an authority management module, configured to in response to a memory allocation request for a first target device sent by a target cabinet outside a cabinet where a server is located, transfer a control authority of the cabinet where the server is located on the first target device to a target cabinet, so that the target cabinet may use a memory of the first target device;

a first action module, configured to in response to a memory reading request sent by the target cabinet through a communication device for data to be read in a memory of the first target device, sending the data to be read in the memory of the first target device to the target cabinet through the communication device;

a second action module, configured to in response to a memory writing request sent by the target cabinet through the communication device for the memory of the first target device, writing data to be written sent by the target cabinet through the communication device into the memory of the first target device.

In order to resolve above problems, the present disclosure also provides a cross-cabinet server memory pooling device, including:

a memory, configured to store a computer program;

a processor, configured to implement steps of the cross-cabinet server memory pooling method according to the embodiments of the present application when executing the computer program.

In order to resolve above problems, the present disclosure also provides a server, including a server body and the cross-cabinet server memory pooling device mentioned above, which is connected with the server body.

In order to resolve above problems, the present disclosure also provides a non-transitory computer-readable storage medium, wherein a computer program is stored on the non-transitory computer-readable storage medium, and when the computer program is executed by a processor, steps of the cross-cabinet server memory pooling method mentioned above are implemented.

The present disclosure provides a cross-cabinet server memory pooling method. Considering that a memory usage of different server cabinets in the same server cluster is different, in the present disclosure, communication devices between different server cabinets are built, and the server cabinets may apply for the memory usage right of the first target device from other server cabinets. After applying for the memory usage right, the cross-cabinet use of the device memory may be realized, and the memory usage requirements of each server cabinet are met without increasing the number of memory devices, and the resource utilization rate is improved.

The present disclosure also provides a cross-cabinet server memory pooling apparatus, device, server and non-transitory computer-readable storage medium, which have the same beneficial effects as the above cross-cabinet server memory pooling method.

BRIEF DESCRIPTION OF THE DRAWINGS

In order to explain the technical solution in the embodiments of the present disclosure more clearly, the appended drawings used in the prior art and the embodiments will be briefly introduced below. Apparently, the appended drawings described below are only some embodiments of the present disclosure. For persons skilled in the art, other drawings may be obtained according to these drawings without expenditure of creative labor.

DETAILED DESCRIPTION

A core of the present disclosure is to provide a cross-cabinet server memory pooling method, which may realize use of memory devices for cross cabinets, meet a requirement of memory usage of each server cabinet without increasing a number of memory devices and improve resource utilization. Another core of the present disclosure is to provide a cross-cabinet server memory pooling apparatus, device, server and non-transitory computer-readable storage medium, which may realize use of memory devices for cross cabinets, meet a requirement of memory usage of each server cabinet without increasing a number of memory devices and improve resource utilization.

In order to make the purpose, technical solution and advantages of the embodiments of the present disclosure clearer, the technical solution in the embodiments of the present disclosure will be described clearly and completely with the appended drawings. Apparently, the described embodiments are a part of the embodiments of the present disclosure, but not the whole embodiment. Based on the embodiments in the present disclosure, all other embodiments obtained by persons skilled in the art without expenditure of creative labor belong to the protection scope of the present disclosure.

Figure 1:
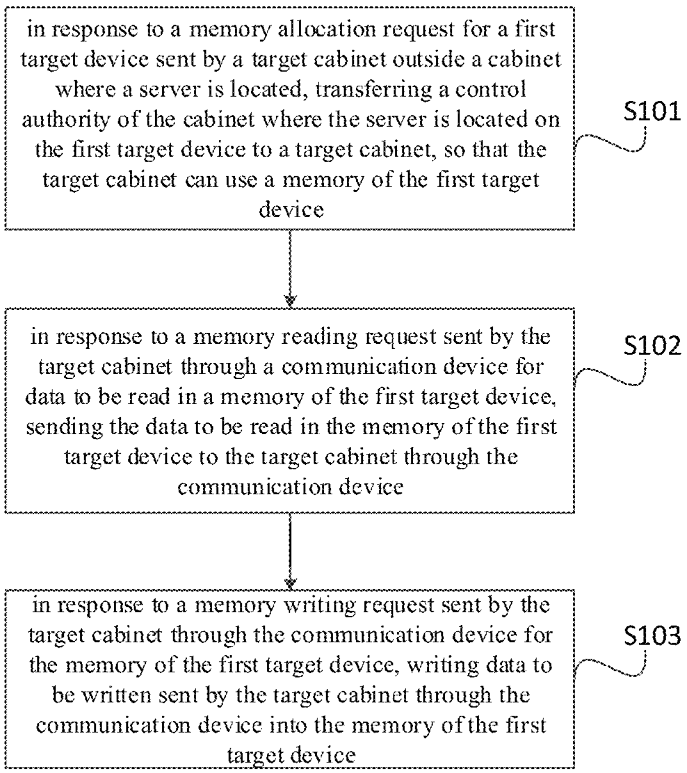
FIG. 1 is a flowchart of a cross-cabinet server memory pooling method provided by the present disclosure.

Please refer to FIG. 1, which is a schematic flow chart of a cross-cabinet server memory pooling method provided by the present disclosure. The cross-cabinet server memory pooling method includes: S101: in response to a memory allocation request for a first target device sent by a target cabinet outside a cabinet where a server is located, transferring a control authority of the cabinet where the server is located on the first target device to a target cabinet, so that the target cabinet may use a memory of the first target device.

Specifically, considering the technical problems in the above background technology and the different memory usage situations of different server cabinets in the same server cluster, the server cabinets with less memory usage have a waste of memory resources at a certain moment, while the server cabinets with more memory usage have a lack of memory resources, so the present disclosure wants to pool the memory of each server cabinet, that is, the memory of each server cabinet may be regarded as a whole through the present disclosure. When each server cabinet needs memory, it may use the memory from this pooled memory pool, so as to realize an effective utilization of memory resources among multiple server cabinets and avoid the waste of memory resources. In this case, the memory use requirements of server cabinets may be met without adding additional memory devices.

Specifically, the memory of the server cabinet is embodied in many devices (usually heterogeneous computing devices) containing memories, including, for example, a general accelerator (GPU, Graphics Processing Unit) with a local memory and an ASIC (Application Specific Integrated Circuit), etc.) and an extended memory (DRAM and non-transitory storage, etc.). The specific features of the so-called cross-cabinet memory pooling in the present disclosure is that one cabinet may apply to another cabinet for a permission to use "a device containing a memory", and obtaining the permission to use is equivalent to obtaining the memory possessed by the device. Therefore, first of all, different server cabinets in the present disclosure may communicate to apply for the right to use the memory of the equipment in the other cabinet. Therefore, in the present disclosure, in response to the memory allocation request for the first target device sent by the target cabinet outside the cabinet where the server is located, the control authority of the cabinet where the server is located on the first target device may be transferred to the target cabinet, so that the target cabinet may use the memory of the first target device.

S102: in response to a memory reading request sent by the target cabinet through a communication device for data to be read in a memory of the first target device, sending the data to be read in the memory of the first target device to the target cabinet through the communication device.

Specifically, after the control authority of the cabinet where the server is located on the first target device is transferred to the target cabinet, the target cabinet may start to use the memory of the first target device. Considering that the use of the memory requires data transmission, the communication device is set in the server cabinets in advance, so the embodiment of the present disclosure may respond to the memory reading request of the data to be read in the memory of the first target device sent by the target cabinet through the communication device. The data to be read in the memory of the first target device is sent to the target cabinet through the communication device, so that the target cabinet may read the memory of the first target device in another server cabinet.

S103: in response to a memory writing request sent by the target cabinet through the communication device for the memory of the first target device, writing data to be written sent by the target cabinet through the communication device into the memory of the first target device.

Specifically, similarly, in this embodiment of the present disclosure, the data to be written by the target cabinet through the communication device may be written into the memory of the first target device in response to the memory writing request sent by the target cabinet through the communication device, that is, the target cabinet may write the memory of the first target device in another server cabinet, so that the target cabinet may read and write the memory of the first target device in another server cabinet, that is, the use of the memory of the first target device in another server cabinet may be successfully realized.

The present disclosure provides a cross-cabinet server memory pooling method. Considering that the memory usage of different server cabinets in the same server cluster is different, the present disclosure builds communication devices between different server cabinets, and the server cabinets may apply for the memory usage permission of the first target device from other server cabinets. After applying for the memory usage permission, the cross-cabinet use of the device memory may be realized, and the memory usage requirements of each server cabinet are met without increasing the number of memory devices, and the resource utilization rate is improved.

In some embodiments, the communication device includes:

a plurality of processing devices 1 respectively connected with server cabinets corresponding to the processing devices one by one and a first communication network 2, which are configured to send a memory usage request and the data to be read and written sent by a main server cabinet to the first communication network 2, and send the memory usage request and the data to be read and written received through the first communication network 2 to the main server cabinet;

the first communication network 2, configured to send the received memory usage request and the data to be read and written to the processing device 1 corresponding to the respective destination cabinets;

wherein, the memory usage request includes a memory reading request and a memory writing request, and the data to be read and written includes data to be written and data to be read, and the main server cabinet is a server cabinet connected with the processing device 1.

Figure 2:
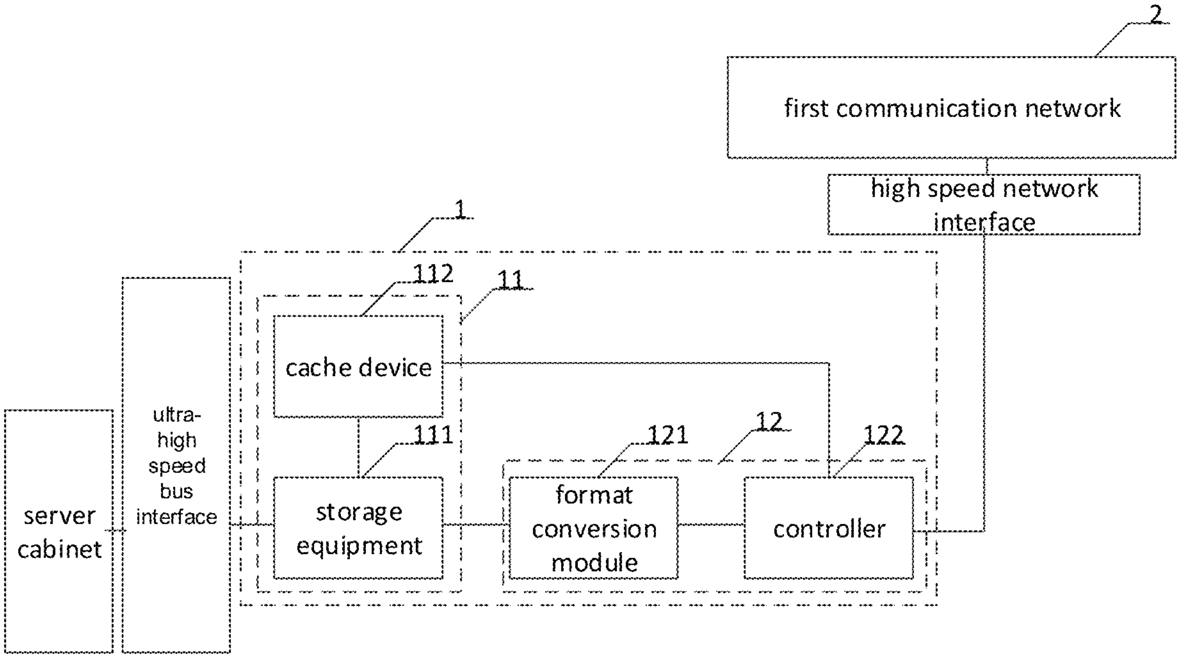
FIG. 2 is a schematic structural diagram of a communication device provided by the present disclosure.

Specifically, in order to better explain the embodiment of the present disclosure, please refer to FIG. 2, which is a structural schematic diagram of a communication device provided by the present disclosure.

Specifically, considering that a communication network is needed for data transmission, the communication device in this embodiment of the present disclosure includes the first communication network 2, and each server cabinet connected to the first communication network 2 may process corresponding data and requests through a dedicated processing device 1, so as to improve reliability of data transmission among server cabinets, therefore in the embodiments of the present disclosure, each server cabinet may be provided with one-to-one processing devices 1, thereby smoothly supporting each server cabinet to read and write the memory of the devices in another server cabinet.

The memory writing request, memory reading request and data to be written may all flow from the main server cabinet to the destination cabinet, and the data to be read may flow from the destination cabinet of the memory reading request to the main server cabinet of the memory reading request.

In some embodiments, the processing device 1 includes:

a storage device 1 connected with the server cabinets corresponding to the storage device one by one, configured to send the memory usage request and the data to be read and written sent by the main server cabinet to a control device 12, and send the memory usage request and the data to be read and written received by the control device 12 through the first communication network 2 to the main server cabinet;

the control devices 12 respectively connected with the storage device 11 and the first communication network 2, configured to send the memory usage request and the data to be read and written sent by the storage device 11 to the first communication network 2, and send the memory usage request and the data to be read and written received through the first communication network 2 to the main server cabinet.

Specifically, the storage device 11 may be directly connected to the main server cabinet, thus presenting a storage pool to the main server cabinet, that is, the main server cabinet may obtain memory resources from a "dynamic storage pool" of the storage device 11 for use, which is beneficial to improving user experience.

Specifically, the control device 12 may transfer request signals and data between the storage device 11 and the first communication network 2.

The processing device 1 in the embodiment of the present disclosure has advantages of simple structure, low failure rate and the like.

Certainly, besides this specific structure, the processing device 1 may also be in other specific forms, and the embodiment of the present disclosure is not limited here.

In some embodiments, the storage device 11 includes:

a storage equipment 111 connected with the server cabinets corresponding to the storage equipment one by one, configured to send the memory usage request sent by the main server cabinet to the control device 12, send the data to be read and written sent by the main server cabinet to a cache device 112, send the memory usage request received by the control device 12 through the first communication network 2 to the main server cabinet, and send the data to be read and written by the control device 12 into the cache device 112 to the main server cabinet;

the cache device 112 connected with the storage equipment 111;

wherein, the control device 12 is respectively connected with the storage equipment 111, the cache device 112 and the first communication network 2, and the control device 12 is specifically configured to send the memory usage request sent by the storage equipment 111 to the first communication network 2, send the data to be read and written sent by the storage equipment 111 to the cache device 112 to the first communication network 2, send the memory usage request received through the first communication network 2 to the storage equipment 111, and send the data to be read and written received through the first communication network 2 to the cache device 112.

Specifically, the storage device 111 directly connected to its corresponding server cabinet may also present a storage device 111 with dynamically changing capacity to its directly connected server cabinet, which is beneficial to improving the user experience.

Considering that data congestion will occur when amount of data read and written in the memory between cabinets is large, which may reduce efficiency of data reading and writing, the storage device 11 in this embodiment of the present disclosure may include a cache device 112, which may cache the data to be read and written, thus helping to reduce data loss, improve the efficiency of data reading and writing, and further enhance the user experience.

In some embodiments, the control device 12 includes a format conversion module 121 and a controller 122.

The format conversion module 121 is configured to convert the memory usage request sent by the storage equipment 111 to the controller 122 from a first data format of the main server cabinet to a specified second data format, so that the controller 122 may identify to use, and convert the memory usage request sent by the main server cabinet to the storage equipment 111 from the second data format to the first data format.

The controller 122 is configured to send the memory usage request sent by the format conversion module 121 to the first communication network 2, send the data to be read and written sent by the storage equipment 111 to the cache device 112 to the first communication network 2, send the memory usage request received through the first communication network 2 to the format conversion module 121, and send the data to be read and written received through the first communication network 2 to the cache device 112.

Specifically, considering that a data format used in each server cabinet may not be uniform with a data format recognized by the controller 122, therefore in order to ensure that work of the memory reading and writing may be performed reliably, the format conversion module 121 in this embodiment of the present disclosure may be configured to convert the memory usage request sent by the storage device 111 to the controller 122 from the first data format of the main server cabinet to the designated second data format, so that the controller 122 may identify to use and convert the memory usage request sent by the main server cabinet to the storage device 111 from the second data format to the first data format. Based on this, the controller 122 may send the memory usage request sent by the format conversion module 121 to the first communication network 2 and send the memory usage request received through the first communication network 2 to the format conversion module 121.

The control device 12 in the embodiment of the present disclosure has the advantages of simple structure and low failure rate.

Certainly, besides this specific structure, the control device 12 may also be in other specific forms, and the embodiment of the present disclosure is not limited here.

In some embodiments, the storage device 111, the format conversion module 121, and the controller 122 are integrated into an FPGA (Field Programmable Gate Array).

Specifically, considering that FPGA has the advantages of small size, low cost and flexible use, the storage device 111, the format conversion module 121 and the controller 122 are implemented based on FPGA in this embodiment of the present disclosure.

Certainly, besides FPGA, the storage device 111, the format conversion module 121 and the controller 122 may also be of other specific types, and the embodiment of the present disclosure is not limited here.

In some embodiments, the first communication network 2 is an RDMA (Remote Direct Memory Access) network based on CXL (Compute Express Link) protocol.

Specifically, considering that the RDMA network based on the CXL protocol has the advantages of fast transmission rate and strong stability, the first communication network 2 in this embodiment of the present disclosure may adopt the RDMA network based on the CXL protocol.

Certainly, besides the RDMA network based on the CXL protocol, the first communication network 2 may also be of other specific types, and the embodiment of the present disclosure is not limited here.

In some embodiments, the method is applied to a server.

The cross-cabinet server memory pooling method also includes:

in response to a memory allocation request for a second target device sent by a first target server in the cabinet where the server is located, releasing a control over the second target device by the server and sending a successful allocation instruction to the first target server, so that the first target server responds to a received successful allocation instruction to address all heterogeneous computing devices containing memories under current jurisdiction of the server and the second target device in a unified manner;

wherein, CPUs of all servers in a single server cabinet are connected with the second communication network, and all heterogeneous computing devices containing memories in the single server cabinet are connected with the second communication network.

Figure 3:
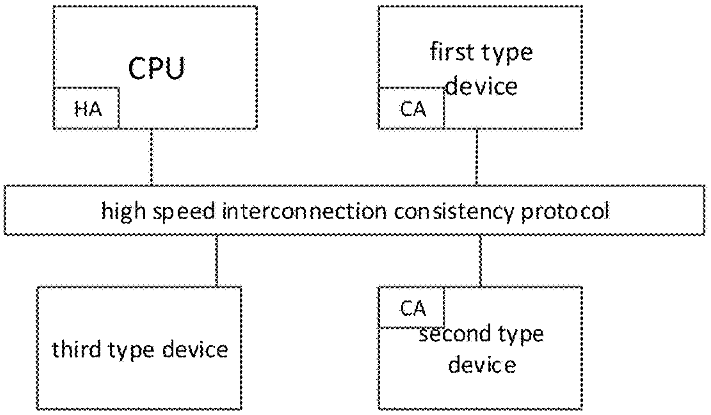
FIG. 3 is a schematic structural diagram of a node memory pooling system provided by the present disclosure.
Figure 4:
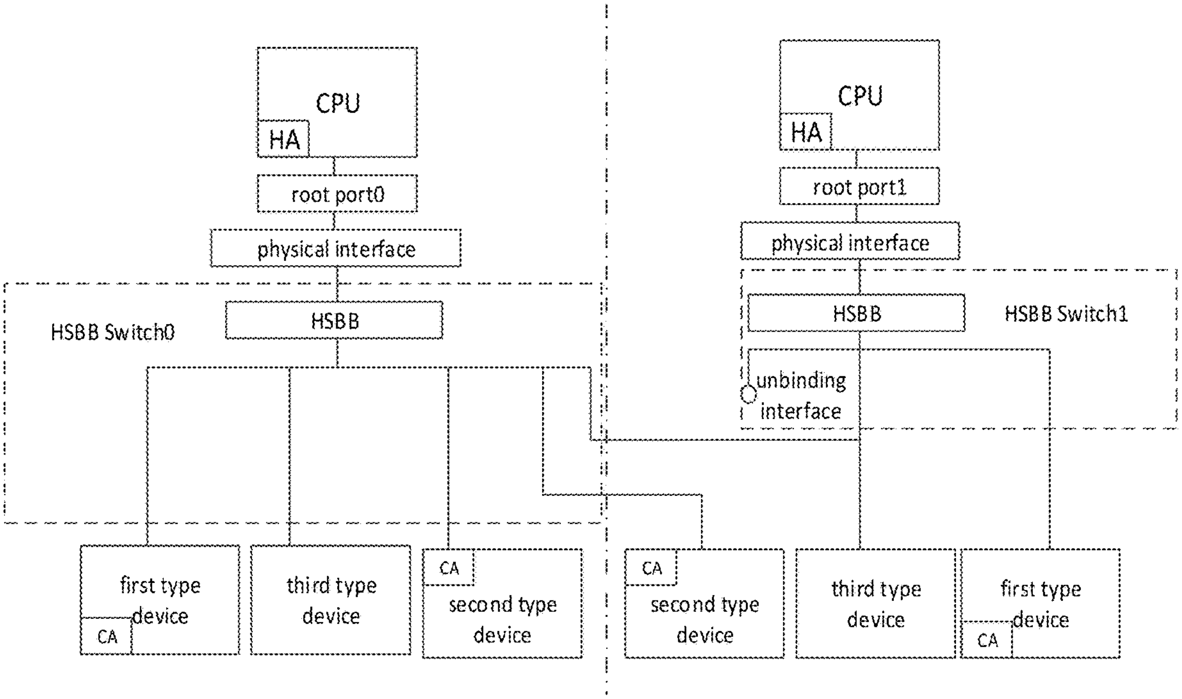
FIG. 4 is a schematic structural diagram of a cabinet memory pooling system provided by the present disclosure.

In order to better explain the embodiment of the present disclosure, please refer to FIG. 3, FIG. 4 and Table 1 below. FIG. 3 is a structural schematic diagram of a node memory pooling system provided by the present disclosure. FIG. 4 is a schematic structural diagram of a cabinet memory pooling system provided by the present disclosure, and Table 1 is a sub-protocol function description table of an SCMP protocol.

TABLE 1 sub-protocol function description table of an SCMP protocol

| Sub-protocol | Description of function |
|---|---|
| SCMP.io | Read and write interface of IO device based on PCIe hardware |
| SCMP.cache | Cache consistency interface to implement cache consistency interaction between the device and the host |
| SCMP.mem | Interface for processing transaction between memories to achieve host memory access |
| SCMP.rmem | Consistency interface of ultra-high speed bus to high speed bus network to achieve cache consistency between racks |

Specifically, a computing architecture supports different types of computing nodes, including general CPU nodes, hybrid memory nodes, and multi-engine computing nodes. General CPU computing nodes include CPU computing devices and DRAM (Dynamic Random Access Memory) memory. The hybrid memory nodes include CPU, DRAM memory and persistent memory. The multi-engine computing nodes include CPU, DRAM memory and various heterogeneous computing devices.

The SCMP (Security Context Mapping Protocol) protocol is compatible with CXL protocol, and three different types of device extensions are supported in the node. A Type-1 (a first type) device represents an accelerator (smart network card, etc.) without local memory, and two sub-protocols, such as SCMP.io and SCMP.cache, are used to realize consistent reading of CPU-end side cache by the smart network card. A Type-2 device represents a general accelerator (GPU, ASIC, etc.) with local memory, and three sub-protocols, such as SCMP.io, SCMP.cache and SCMP-.mem, are used to realize the CPU's reading of the cache in the accelerator,_and the accelerator may also read the cache on the CPU-end side in a consistent way. A Type-3 device represents an extended memory (DRAM, non-transitory storage, etc.) and use two sub-protocols, such as SCMP.io and SCMP.mem to realize the CPU's consistent reading of the cache of the third type device. An HA (Home Agent) is placed on the CPU-end side, which is responsible for reading and writing the memory. A CA (Cache Agent) is placed on a device-end side, which is responsible for management of cache contents. Both of them work together to maintain consistency of the memory.

Specifically, with reference to FIG. 3, in order to realize memory pooling among server cabinets, memory pooling within a single server cabinet may be realized in advance. The embodiment of the present disclosure provides a specific method for memory pooling within a cabinet. Each server in a server cabinet may communicate to apply for memory allocation for a second target device containing a memory in other servers. If conditions are met, then the server receiving the memory allocation may release its control over the second target device and send a successful allocation instruction to the first target server, so that the first target server may address all the heterogeneous computing devices containing memories and the second target device under its current jurisdiction in a unified manner in response to the received successful allocation instruction, so as to realize the memory use for all the heterogeneous computing devices containing memories and the second target device under its current jurisdiction.

Specifically, with respect to FIG. 4, the present disclosure proposes an SCMP switching technology based on the CXL protocol, which realizes cross-node memory expansion through interconnection link and efficient switching and hot plug technology in a rack (between nodes), and supports the second type devices using SCMP.io and SCMP.mem protocols and the third type devices using SCMP.io, SCMP.cache and SCMP.mem protocols respectively. Wherein, a Root port may gather multiple devices of the second type and the third type together and mount them under the CPU. The Root port is connected to a virtual high speed bus bridge, and local devices of the first type, the second type and the third type are connected through a virtual physical binding interface extended by the virtual high speed bus bridge and converged into a physical interface of the Root port. HSBB is High Speed Bus Bridge, VHS is Virtual HSBB Switch, and vHSBB is virtual high speed bus bridge. Cross-node memory expansion only supports expansion of the second and third types of devices under VHS1 devices into VHS0. A realization principle is that when the memory of Type1 devices or Type2 devices in root port1 is logically divided into root port0, the CPU in root port0 re-addresses the types-1, Type-2, Type-3 devices under root port0 and Type-2 and Type-3 devices under root port1 in a unified way, and the memory are jointly managed and allocated to use by the CPU in root port0. At the same time, the CPU in root port1 and other computing devices lose access to the local Type2 device memory or Type3 device memory.

Specifically, with respect to FIG. 2, a key protection scope of the present disclosure lies in an inter-rack memory expansion strategy. Type-4 devices supporting SCMP.rmem protocol (that is, the processing device 1 in FIG. 2) are connected between racks to realize a consistent interconnection of cross-rack memories of "an ultra-high-speed bus to a high-speed network conversion", wherein the ultra-high-speed bus is PCIe (Peripheral Component Interconnect Express) used in racks/nodes, which is a physical link of high-speed serial computer extended bus standard 5.0 or above. A high-speed interconnection network refers to the RDMA network based on IB (InfiniBand)/RoCE (RDMA over Converged Ethemet)/iWARP (Internet Wide Area RDMA Protocol). The cabinets are interconnected by high-speed switches. The local Type-4 device realizes the consistency interconnection of memories between cabinets, and its physical connection diagram is shown in FIG. 2.

In FIG. 2, a left side is an ultra-high-speed interconnection bus and its interface inside a cabinet, and a right side is a high-speed network and its interface. In the middle is a diagram of physical components for a conversion from the ultra-high-speed interconnection bus to the high-speed interconnection network, and a working principle is as follows: when a memory of the Type-2 device or Type-3 device at an end of an extended cabinet (a server cabinet not directly connected with the connecting device) is managed by the CPU at an end of the main cabinet, the memory at the end of the extended cabinet and the memory in the main cabinet may be addressed and managed in a unified way. When the CPU of the main cabinet uses the memory of the extended cabinet, the controller caches memory data in the end of the extended cabinet into the cache device to realize Local data Remote coherence. The cache device may be composed of memories of a DDR5 (Double Data Rate 5, fifth generation double data rate memory), and a currently supported maximum capacity is 512 GB. An address translation module realizes converting a memory address in the extended cabinet into a memory address that the CPU in the main cabinet may recognize.

The CPUs of all servers in a single server cabinet are connected to the second communication network, and all heterogeneous computing devices containing memories in a single server cabinet are connected to the second communication network. In this way, each server has a basic communication link with all heterogeneous computing devices containing memories in the cabinet, and applied devices may use the memory after applying for the permission to use the memory.

In some embodiments, the cross-cabinet server memory pooling method further includes:

when a memory space of the server is insufficient, determining whether there are remaining memory resources in other servers in the cabinet where the server is located;

sending a memory allocation request for a third target device to a second target server in the cabinet where the server is located if there are remaining memory resources in other servers in the cabinet where the server is located;

in response to the successful allocation instruction received from the second target server, addressing all the heterogeneous computing devices containing memories under the current jurisdiction of the server and the second target device in a unified manner for memory use.

Specifically, considering that a single server may apply for a memory, it also needs to apply for a memory from other servers when the memory is insufficient, the server in this embodiment of the present disclosure may actively send a memory allocation request for the third target device to the second target server in the cabinet where the server is located, and if the second target server allows, the server may receive a successful allocation instruction from the second target server, and address all heterogeneous computing devices containing memories under the current jurisdiction of the server and the second target device in a unified manner for memory use.

In some embodiments, after in response to the successful allocation instruction received from the second target server, addressing all the heterogeneous computing devices containing memories under the current jurisdiction of the server and the second target device in a unified manner, the cross-cabinet server memory pooling method further includes:

sending information of all heterogeneous computing devices containing memories under the current jurisdiction of the server respectively to other servers in the server cabinet where the server is located and keep in communication with the server.

Specifically, considering that when each server applies for a memory from other servers, it is best to know situation of heterogeneous computing devices containing memories under the jurisdiction of other servers in advance, so as to improve application efficiency, therefore, the server in this embodiment of the present disclosure may also send all the information of heterogeneous computing devices containing memories under the current jurisdiction of the server respectively to other servers in the server cabinet where the server is located and keep in communication with the server.

The information of all heterogeneous computing devices containing memories under the current jurisdiction of the server may contain a variety of contents, such as a device type, a device name, a device address and a device memory usage, etc., and the embodiment of the present disclosure is not limited here.

In some embodiments, the second communication network is VHSBB (Virtual High Speed Bus Bridge).

Specifically, vHSBB has the advantages of high communication rate and strong stability.

Certainly, besides vHSBB, the second communication network may also be of other types, and the embodiment of the present disclosure is not limited here.

In some embodiments, the cross-cabinet server memory pooling method further includes:

controlling a prompter to prompt the information of all heterogeneous computing devices containing memories under the current jurisdiction of the server.

Specifically, considering that the user needs to know the information of all heterogeneous computing devices containing memories under the current jurisdiction of each server in some cases, the server in the embodiment of the present disclosure may control the prompter to prompt the information of all heterogeneous computing devices containing memories under the current jurisdiction of the server, which is beneficial to improving the user experience.

The prompter may be of various types, such as a display, etc., and the embodiment of the present disclosure is not limited here.

In some embodiments, the cross-cabinet server memory pooling method further includes: when a memory space of the server is insufficient, determining whether there are remaining memory resources in other servers in the cabinet where the server is located;

if there are no remaining memory resources in other servers in the cabinet where the server is located, sending a memory allocation request for a fourth target device to the target cabinet outside the cabinet where the server is located;

determining whether a successful allocation fed back by the target cabinet is received;

sending a memory usage request to the fourth target device applied in the target cabinet, if the successful allocation signal fed back by the target cabinet is received.

Specifically, in order to realize a bidirectional memory allocation, the server cabinet in the embodiment of the present disclosure may also send a memory allocation request for the fourth target device to the target cabinet outside the cabinet where the server is located when the memory space of the server is insufficient and other servers in the cabinet where the server is located have no remaining memory resources. If the successful allocation signal fed back by the target cabinet is received, it may send a memory usage request to the fourth target device applied in the target cabinet to start memory use, which improves flexibility of mutual use of memories.

In some embodiments, after determining whether the successful allocation signal fed back by the target cabinet is received, the cross-cabinet server memory pooling method further includes:

if the successful allocation signal fed back by the target cabinet is not received, controlling the prompter to prompt that a memory allocation fails.

Specifically, considering that the memory application may fail due to link failure and other reasons, in order to facilitate the staff to know an abnormal situation in time, in the present disclosure embodiment, when the successful allocation signal fed back by the target cabinet is not received, the controller may also control the prompter to prompt that the memory allocation fails.

The determining of "the successful allocation signal fed back by the target cabinet is not received" may be determined by a preset timeout period. If the successful allocation signal is not received after the memory allocation is issued for more than the timeout period, it may be determined that the successful allocation signal fed back by the target cabinet is not received.

The timeout duration may be set independently, and the embodiment of the present disclosure is not limited here.

In some embodiments, the cross-cabinet server memory pooling method further includes:

determining whether a free memory space of all heterogeneous computing devices containing memories under the current jurisdiction of the server is greater than a preset value;

if the free memory space of all heterogeneous computing devices containing memories under the current jurisdiction of the server is greater than the preset value, determining whether an existence duration of the free memory space greater than the preset value reaches a preset duration;

if the existence duration of the free memory space greater than the preset value reaches the preset duration, controlling the prompter to prompt that a memory is free.

Specifically, considering that in some cases, in all heterogeneous computing devices containing memories under the jurisdiction of the server, a state that the free memory space is greater than the preset value may last for a long time, which may be caused by many factors, and resources are wasted in any case, therefore, in this case, the embodiment of the present disclosure may control the prompter to prompt that the memory is free, so that the staff may intervene and further improve the resource utilization rate.

In some embodiments, after determining whether the existence duration of the free memory space greater than the preset value reaches a preset duration, the cross-cabinet server memory pooling method further includes:

if the existence duration of the free memory space greater than the preset value reaches the preset duration, determining a third target server with the smallest remaining memory space in the server cabinet where the server is located;

transferring the control right of the heterogeneous computing device with the largest remaining memory space under the jurisdiction of the server to the third target server.

Specifically, in order to automatically improve the resource utilization rate, in this embodiment of the present disclosure, after it is determined that the existence duration of the free memory space greater than the preset value reaches the preset duration, the third target server with the smallest remaining memory space in the server cabinet where the server is located may be determined, and the control right of the heterogeneous computing device with the largest remaining memory space under the jurisdiction of the server may be transferred to the third target server, so as to save the action time for the third target server to actively apply for memory, and improve work efficiency and user experience.

Figure 5:
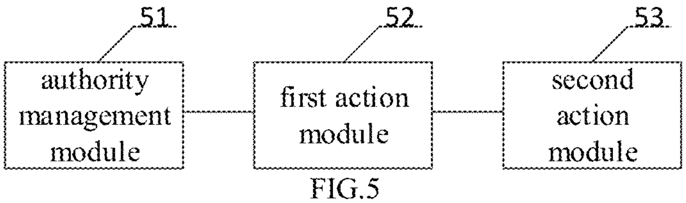
FIG. 5 is a structural schematic diagram of a server memory optimization apparatus provided by the present disclosure.

Please refer to FIG. 5, which is a structural schematic diagram of a cross-cabinet server memory pooling apparatus provided by the present disclosure. The cross-cabinet server memory pooling apparatus includes:

an authority management module 51, configured to in response to a memory allocation request for a first target device sent by a target cabinet outside a cabinet where a server is located, transfer a control authority of the cabinet where the server is located on the first target device to a target cabinet, so that the target cabinet may use a memory of the first target device;

a first action module 52, configured to in response to a memory reading request sent by the target cabinet through a communication device for data to be read in a memory of the first target device, sending the data to be read in the memory of the first target device to the target cabinet through the communication device;

a second action module 53, configured to in response to a memory writing request sent by the target cabinet through the communication device for the memory of the first target device, writing data to be written sent by the target cabinet through the communication device into the memory of the first target device.

The present disclosure provides a cross-cabinet server memory pooling apparatus. Considering that a memory usage of different server cabinets in the same server cluster is different, in the present disclosure, communication devices between different server cabinets are built, and the server cabinets may apply for the memory usage right of the first target device from other server cabinets. After applying for the memory usage right, the cross-cabinet use of the device memory may be realized, and the memory usage requirements of each server cabinet are met without increasing the number of memory devices, and the resource utilization rate is improved.

For the introduction of the cross-cabinet server memory pooling apparatus provided by the embodiment of the present disclosure, please refer to the aforementioned embodiments of the cross-cabinet server memory pooling method, and the embodiment of the present disclosure is not repeated here.

Figure 6:
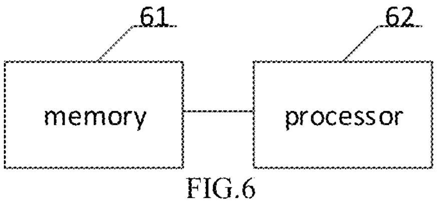
FIG. 6 is a schematic structural diagram of a server memory optimization device provided by the present disclosure.

Please refer to FIG. 6, which is a schematic diagram of a cross-cabinet server memory pooling device provided by the present disclosure. The cross-rack server memory pooling device includes:

a memory 61, configured to store a computer program;

a processor 62, configured to implement the steps of the cross-cabinet server memory pooling method as described in the previous embodiments when executing the computer program.

Specifically, the memory includes a non-transitory storage medium and a memory storage device. The non-transitory storage medium stores an operating system and computer-readable instructions, and the memory storage device provides an environment for the operation of the operating system and computer-readable instructions in the non-transitory storage medium.

When the processor executes the computer program stored in the storage device, it may implement the following steps: in response to a memory allocation request for a first target device sent by a target cabinet outside a cabinet where a server is located, transferring a control authority of the cabinet where the server is located on the first target device to a target cabinet, so that the target cabinet may use a memory of the first target device; in response to a memory reading request sent by the target cabinet through a communication device for data to be read in a memory of the first target device, sending the data to be read in the memory of the first target device to the target cabinet through the communication device; in response to a memory writing request sent by the target cabinet through the communication device for the memory of the first target device, writing data to be written sent by the target cabinet through the communication device into the memory of the first target device.

The present disclosure provides the cross-cabinet server memory pooling device. Considering that a memory usage of different server cabinets in the same server cluster is different, in the present disclosure, communication devices between different server cabinets are built, and the server cabinets may apply for the memory usage right of the first target device from other server cabinets. After applying for the memory usage right, the cross-cabinet use of the device memory may be realized, and the memory usage requirements of each server cabinet are met without increasing the number of memory devices, and the resource utilization rate is improved.

In some embodiments, the communication device includes:

a plurality of processing devices 1 respectively connected with server cabinets corresponding to the processing devices one by one and a first communication network 2, which are configured to send a memory usage request and the data to be read and written sent by a main server cabinet to the first communication network 2, and send the memory usage request and the data to be read and written received through the first communication network 2 to the main server cabinet;

the first communication network 2, configured to send the received memory usage request and the data to be read and written to the processing device 1 corresponding to the respective destination cabinets;

wherein, the memory usage request includes a memory reading request and a memory writing request, and the data to be read and written includes data to be written and data to be read, and the main server cabinet is a server cabinet connected with the processing device 1.

In some embodiments, the processing device 1 includes:

a storage device 1 connected with the server cabinets corresponding to the storage device one by one, configured to send the memory usage request and the data to be read and written sent by the main server cabinet to a control device 12, and send the memory usage request and the data to be read and written received by the control device 12 through the first communication network 2 to the main server cabinet;

the control devices 12 respectively connected with the storage device 11 and the first communication network 2, configured to send the memory usage request and the data to be read and written sent by the storage device 11 to the first communication network 2, and send the memory usage request and the data to be read and written received through the first communication network 2 to the main server cabinet.

In some embodiments, the storage device 11 includes:

a storage equipment 111 connected with the server cabinets corresponding to the storage equipment one by one, configured to send the memory usage request sent by the main server cabinet to the control device 12, send the data to be read and written sent by the main server cabinet to a cache device 112, send the memory usage request received by the control device 12 through the first communication network 2 to the main server cabinet, and send the data to be read and written by the control device 12 into the cache device 112 to the main server cabinet;

the cache device 112 connected with the storage equipment 111;

wherein, the control device 12 is respectively connected with the storage equipment 111, the cache device 112 and the first communication network 2, and the control device 12 is specifically configured to send the memory usage request sent by the storage equipment 111 to the first communication network 2, send the data to be read and written sent by the storage equipment 111 to the cache device 112 to the first communication network 2, send the memory usage request received through the first communication network 2 to the storage equipment 111, and send the data to be read and written received through the first communication network 2 to the cache device 112.

In some embodiments, the control device 12 includes a format conversion module 121 and a controller 122.

The format conversion module 121 is configured to convert the memory usage request sent by the storage equipment 111 to the controller 122 from a first data format of the main server cabinet to a specified second data format, so that the controller 122 may identify to use, and convert the memory usage request sent by the main server cabinet to the storage equipment 111 from the second data format to the first data format.

The controller 122 is configured to send the memory usage request sent by the format conversion module 121 to the first communication network 2, send the data to be read and written sent by the storage equipment 111 to the cache device 112 to the first communication network 2, send the memory usage request received through the first communication network 2 to the format conversion module 121, and send the data to be read and written received through the first communication network 2 to the cache device 112.

In some embodiments, the storage device 111, the format conversion module 121, and the controller 122 are integrated into an FPGA (Field Programmable Gate Array).

In some embodiments, the first communication network 2 is an RDMA (Remote Direct Memory Access) network based on CXL (Compute Express Link) protocol.

In some embodiments, the following steps may be implemented when the processor executes a computer subroutine stored in memory: in response to a memory allocation request for a second target device sent by a first target server in the cabinet where the server is located, releasing a control over the second target device by the server and sending a successful allocation instruction to the first target server, so that the first target server responds to a received successful allocation instruction to address all heterogeneous computing devices containing memories under current jurisdiction of the server and the second target device in a unified manner;

wherein, CPUs of all servers in a single server cabinet are connected with the second communication network, and all heterogeneous computing devices containing memories in the single server cabinet are connected with the second communication network.

In some embodiments, the following steps may be implemented when the processor executes the computer subroutine stored in memory:

when a memory space of the server is insufficient, determining whether there are remaining memory resources in other servers in the cabinet where the server is located;

sending a memory allocation request for a third target device to a second target server in the cabinet where the server is located if there are remaining memory resources in other servers in the cabinet where the server is located;

in response to the successful allocation instruction received from the second target server, addressing all the heterogeneous computing devices containing memories under the current jurisdiction of the server and the second target device in a unified manner for memory use.

In some embodiments, the following steps may be implemented when the processor executes the computer subroutine stored in memory: sending information of all heterogeneous computing devices containing memories under the current jurisdiction of the server respectively to other servers in the server cabinet where the server is located and keep in communication with the server.

In some embodiments, the second communication network is a virtual high speed bus bridge network (vHSBB).

In some embodiments, the cross-cabinet server memory pooling method further includes: controlling a prompter to prompt the information of all heterogeneous computing devices containing memories under the current jurisdiction of the server.

In some embodiments, the following steps may be implemented when the processor executes the computer subroutine stored in memory:

when a memory space of the server is insufficient, determining whether there are remaining memory resources in other servers in the cabinet where the server is located;

if there are no remaining memory resources in other servers in the cabinet where the server is located, sending a memory allocation request for a fourth target device to the target cabinet outside the cabinet where the server is located;

determining whether a successful allocation fed back by the target cabinet is received; sending a memory usage request to the fourth target device applied in the target cabinet, if the successful allocation signal fed back by the target cabinet is received.

In some embodiments, the following steps may be implemented when the processor executes the computer subroutine stored in memory: after determining whether the successful allocation signal fed back by the target cabinet is received, if the successful allocation signal fed back by the target cabinet is not received, controlling the prompter to prompt that a memory allocation fails.

As an optional embodiment, determining whether a free memory space of all heterogeneous computing devices containing memories under the current jurisdiction of the server is greater than a preset value;

if the free memory space of all heterogeneous computing devices containing memories under the current jurisdiction of the server is greater than the preset value, determining whether an existence duration of the free memory space greater than the preset value reaches a preset duration;

if the existence duration of the free memory space greater than the preset value reaches the preset duration, controlling the prompter to prompt that a memory is free.

In some embodiments, the following steps may be implemented when the processor executes the computer subroutine stored in memory: if the existence duration of the free memory space greater than the preset value reaches the preset duration, determining a third target server with the smallest remaining memory space in the server cabinet where the server is located;

transferring the control right of the heterogeneous computing device with the largest remaining memory space under the jurisdiction of the server to the third target server.

For the introduction of the cross-cabinet server memory pooling device provided by the embodiments of the present disclosure, please refer to the embodiments of the cross-cabinet server memory pooling method described above. The embodiments of the present disclosure will not elaborate on this again.

The present disclosure also provides a server, including a server main body and a cross-cabinet server memory pooling device connected to the server main body as described in the above embodiments.

The present disclosure provides a server. Considering that a memory usage of different server cabinets in the same server cluster is different, in the present disclosure, communication devices between different server cabinets are built, and the server cabinets may apply for the memory usage right of the first target device from other server cabinets. After applying for the memory usage right, the cross-cabinet use of the device memory may be realized, and the memory usage requirements of each server cabinet are met without increasing the number of memory devices, and the resource utilization rate is improved.

For the introduction of the server cluster provided by the embodiments of the present disclosure, please refer to the embodiments of the cross-cabinet server memory pooling method described above. The embodiments of the present disclosure will not elaborate on this again.

Figure 7:
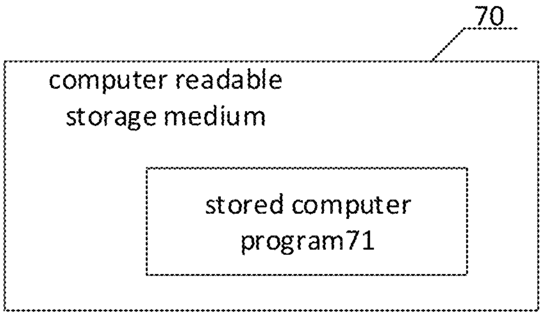
FIG. 7 is a schematic structural diagram of a non-transitory computer-readable storage medium provided by the present disclosure.

Please refer to FIG. 7, where FIG. 7 is a schematic diagram of a non-transitory computer-readable storage medium. The non-transitory computer-readable storage medium 70 stores a computer program 71, and the computer program 71 is executed by the processor 62 to implement the steps of the cross-cabinet server memory pooling method as described in the above embodiments.

The present disclosure provides a non-transitory computer-readable storage medium. Considering that a memory usage of different server cabinets in the same server cluster is different, in the present disclosure, communication devices between different server cabinets are built, and the server cabinets may apply for the memory usage right of the first target device from other server cabinets. After applying for the memory usage right, the cross-cabinet use of the device memory may be realized, and the memory usage requirements of each server cabinet are met without increasing the number of memory devices, and the resource utilization rate is improved.

For the introduction of the non-transitory computer-readable storage medium provided by the embodiments of the present disclosure, please refer to the embodiments of the cross-cabinet server memory pooling method described above. The embodiments of the present disclosure will not elaborate on this again.

Each embodiment in this specification is described in a progressive way, and each embodiment focuses on the differences from other embodiments, so it is only necessary to refer to the same and similar parts between each embodiment. As for the device disclosed in the embodiment, because it corresponds to the method disclosed in the embodiment, the description is relatively simple, and the relevant points may only be described in the method part. It should also be noted that in this specification, relational terms such as first and second are only used to distinguish one entity or operation from another entity or operation, and do not necessarily require or imply any such actual relationship or order between these entities or operations. Moreover, the terms “containing”, “including” or any other variation thereof are intended to cover non-exclusive inclusion, so that a process, method, article or equipment including a series of elements includes not only those elements, but also other elements not explicitly listed or elements inherent to such process, method, article or equipment. Without more restrictions, an element defined by the phrase “including one” does not exclude the existence of other identical elements in the process, method, article or equipment that includes the element.

The foregoing description of the disclosed embodiments enables those skilled in the art to make or use the present disclosure. Many modifications to these embodiments will be obvious to those skilled in the art, and the general principles defined herein may be implemented in other embodiments without departing from the spirit or scope of the present disclosure. Therefore, the present disclosure will not be limited to the embodiments shown herein, but is to be accorded the widest scope consistent with the principles and novel features disclosed herein.

The invention claimed is:

1. A cross-cabinet server memory pooling method, comprising:

determining that a memory allocation request for a first target device sent by a target cabinet outside a cabinet where a server is located, is received, then transferring a control authority of the cabinet where the server is located on the first target device to the target cabinet, so that the target cabinet is capable to use a memory of the first target device;

determining that a memory reading request sent by the target cabinet through a communication device for data to be read in a memory of the first target device, is received, then sending the data to be read in the memory of the first target device to the target cabinet through the communication device; and determining that a memory writing request sent by the target cabinet through the communication device for the memory of the first target device, is received, then writing data to be written sent by the target cabinet through the communication device into the memory of the first target device;

wherein the cross-cabinet server memory pooling method further comprises:

determining that a memory space of the server is insufficient for a memory allocation, then determining whether there are remaining memory resources in other servers in the cabinet where the server is located;

determining that there are no remaining memory resources in other servers in the cabinet where the server is located, then sending a memory allocation request for a fourth target device to the target cabinet outside the cabinet where the server is located;

determining whether a successful allocation signal fed back by the target cabinet is received; and determining that the successful allocation signal fed back by the target cabinet is received, then sending a memory usage request to the fourth target device applied in the target cabinet.

2. The cross-cabinet server memory pooling method according to claim 1, wherein the communication device comprises:

a plurality of processing devices respectively connected with server cabinets corresponding to processing devices one by one and a first communication network, which are configured to send the memory usage request and the data to be read and written sent by a main server cabinet to the first communication network, and send the memory usage request and the data to be read and written received through the first communication network to the main server cabinet; and the first communication network, configured to send the received memory usage request and the data to be read and written to the processing devices corresponding to respective destination cabinets;

wherein the memory usage request comprises the memory reading request and the memory writing request, the data to be read and written comprises the data to be written and the data to be read, and the main server cabinet is a server cabinet connected with one of the processing devices.

3. The cross-cabinet server memory pooling method according to claim 2, wherein each of the processing devices comprises:

a storage device connected with the server cabinet corresponding to the storage device one by one, configured to send the memory usage request and the data to be read and written sent by the main server cabinet to a control device, and send the memory usage request and the data to be read and written received by the control device through the first communication network to the main server cabinet; and the control device respectively connected with the storage device and the first communication network, configured to send the memory usage request and the data to be read and written sent by the storage device to the first communication network, and send the memory usage request and the data to be read and written received through the first communication network to the main server cabinet.

4. The cross-cabinet server memory pooling method according to claim 3, wherein the storage device comprises:

a storage equipment connected with the server cabinets corresponding to the storage equipment one by one, configured to send the memory usage request sent by the main server cabinet to the control device, send the data to be read and written sent by the main server cabinet to a cache device, send the memory usage request received by the control device through the first communication network to the main server cabinet, and send the data to be read and written by the control device into the cache device to the main server cabinet; and the cache device connected with the storage equipment;

wherein the control device is respectively connected with the storage equipment, the cache device and the first communication network, and the control device is specifically configured to send the memory usage request sent by the storage equipment to the first communication network, send the data to be read and written sent by the storage equipment to the cache device to the first communication network, send the memory usage request received through the first communication network to the storage equipment, and send the data to be read and written received through the first communication network to the cache device.

5. The cross-cabinet server memory pooling method according to claim 4, wherein the control device comprises a format conversion module and a controller;

the format conversion module is configured to convert the memory usage request sent by the storage equipment to the controller from a first data format of the main server cabinet to a specified second data format, so that the controller is capable to identify to use, and convert the memory usage request sent by the main server cabinet to the storage equipment from the second data format to the first data format; and the controller is configured to send the memory usage request sent by the format conversion module to the first communication network, send the data to be read and written sent by the storage equipment to the cache device to the first communication network, send the memory usage request received through the first communication network to the format conversion module, and send the data to be read and written received through the first communication network to the cache device.

6. The cross-cabinet server memory pooling method according to claim 5, wherein the storage equipment, the format conversion module and the controller are integrated to a field programmable gate array (FPGA).

7. The cross-cabinet server memory pooling method according to claim 2, wherein the first communication network is a Remote Direct Data Access (RDMA) network based on a Compute Express Link (CXL) protocol.

8. The cross-cabinet server memory pooling method according to claim 1, which is applied to servers;

the cross-cabinet server memory pooling method further comprises:

determining that a memory allocation request for a second target device sent by a first target server in the cabinet where the server is located, is received, then releasing a control over the second target device by the server and sending a successful allocation instruction to the first target server, so that the first target server responds to a received successful allocation instruction to address all heterogeneous computing devices containing memories under current jurisdiction of the server and the second target device in a unified manner;

wherein CPUs of all servers in a single server cabinet are connected with a second communication network, and all heterogeneous computing devices containing memories in the single server cabinet are connected with the second communication network.

9. The method for pooling memory of cross-cabinet servers according to claim 8, wherein the second communication network is a virtual high speed bus bridge network (vHSBB).

10. A cross-cabinet server memory pooling device, comprising:

a memory, configured to store a computer program;

a processor, configured to implement steps of a cross-cabinet server memory pooling method when executing the computer program, wherein the cross-cabinet server memory pooling method comprises:

determining that a memory allocation request for a first target device sent by a target cabinet outside a cabinet where a server is located, is received, then transferring a control authority of the cabinet where the server is located on the first target device to the target cabinet, so that the target cabinet is capable to use a memory of the first target device;

determining that a memory reading request sent by the target cabinet through a communication device for data to be read in a memory of the first target device, is received, then sending the data to be read in the memory of the first target device to the target cabinet through the communication device; and determining that a memory writing request sent by the target cabinet through the communication device for the memory of the first target device, is received, then writing data to be written sent by the target cabinet through the communication device into the memory of the first target device;

wherein the cross-cabinet server memory pooling method further comprises:

determining that a memory space of the server is insufficient, then determining whether there are remaining memory resources in other servers in the cabinet where the server is located;

determining that there are no remaining memory resources in other servers in the cabinet where the server is located, then sending a memory allocation request for a fourth target device to the target cabinet outside the cabinet where the server is located;

determining whether a successful allocation signal fed back by the target cabinet is received; and determining that the successful allocation signal fed back by the target cabinet is received, then sending a memory usage request to the fourth target device applied in the target cabinet.

11. A server, comprising a server body and a cross-cabinet server memory pooling device, which is connected with the server body, wherein the cross-cabinet server memory pooling device is configured to:

determine that a memory allocation request for a first target device sent by a target cabinet outside a cabinet where a server is located, is received, then transfer a control authority of the cabinet where the server is located on the first target device to the target cabinet, so that the target cabinet is capable to use a memory of the first target device;

determine that a memory read request sent by the target cabinet through a communication device for data to be read in a memory of the first target device, is received, then send the data to be read in the memory of the first target device to the target cabinet through the communication device; and determine that a memory write request sent by the target cabinet through the communication device for the memory of the first target device, is received, then write data to be written sent by the target cabinet through the communication device into the memory of the first target device;

wherein the cross-cabinet server memory pooling device is further configured to:

determine that a memory space of the server is insufficient, then determine whether there are remaining memory resources in other servers in the cabinet where the server is located;

determine that there are no remaining memory resources in other servers in the cabinet where the server is located, then send a memory allocation request for a fourth target device to the target cabinet outside the cabinet where the server is located;

determine whether a successful allocation signal fed back by the target cabinet is received; and determine that the successful allocation signal fed back by the target cabinet is received, then send a memory usage request to the fourth target device applied in the target cabinet.

12. A non-transitory computer-readable storage medium, wherein a computer program is stored on the non-transitory computer-readable storage medium, and when the computer program is executed by a processor, steps of the cross-cabinet server memory pooling method according to claim 1 are implemented.

13. The cross-cabinet server memory pooling method according to claim 1, wherein a storage device is directly connected to a main server cabinet, and the main server cabinet obtains memory resources from the storage device for use.

14. The cross-cabinet server memory pooling method according to claim 13, wherein the storage device which is directly connected to its corresponding server cabinet is a storage device with dynamically changing capacity.

* * * * *